US007685753B2

(12) United States Patent
Slowski

(10) Patent No.: US 7,685,753 B2
(45) Date of Patent: Mar. 30, 2010

(54) LED ILLUMINATED HOUSE NUMBER AND SIGN CHARACTERS

(76) Inventor: Darrel R. Slowski, P.O. Box 252 R.R. #1 Schomberg, Schomberg, On (CA) L0G 1T0

( * ) Notice: Subject to any disclaimer, the term of this patent is extended or adjusted under 35 U.S.C. 154(b) by 346 days.

(21) Appl. No.: 11/516,485

(22) Filed: Sep. 7, 2006

(65) Prior Publication Data

US 2007/0113441 A1 May 24, 2007

Related U.S. Application Data

(63) Continuation-in-part of application No. 10/729,927, filed on Dec. 9, 2003, now Pat. No. 7,263,792.

(51) Int. Cl.
*G09F 13/28* (2006.01)
*G09F 13/00* (2006.01)
*G09F 13/18* (2006.01)
*G09F 13/04* (2006.01)
*G09F 23/00* (2006.01)
*F21V 7/04* (2006.01)

(52) U.S. Cl. ............................ 40/550; 40/546; 40/564; 40/565; 40/566; 40/580; 40/551; 40/552; 40/570; 40/571; 362/600; 362/565; 362/566; 362/351; 362/248; 362/634; 362/249.16; 362/806; 362/807; 362/812

(58) Field of Classification Search .................. 40/546, 40/564–566, 580, 550–552, 570; 362/600–634, 362/565, 566, 248, 252, 351, 249.16, 806, 362/807, 812
See application file for complete search history.

(56) References Cited

U.S. PATENT DOCUMENTS

| 3,566,525 | A | * | 3/1971 | Nassil et al. ................... 40/552 |
| 4,843,524 | A | * | 6/1989 | Krent et al. ................... 362/127 |
| 5,299,109 | A | * | 3/1994 | Grondal ...................... 362/241 |
| 5,634,287 | A | * | 6/1997 | Lamparter .................... 40/572 |
| 6,824,300 | B2 | * | 11/2004 | Drews et al. ................. 362/515 |
| 7,263,792 | B2 | * | 9/2007 | Slowski ........................ 40/544 |
| 2004/0255497 | A1 | * | 12/2004 | Venkataraman et al. ....... 40/551 |

* cited by examiner

*Primary Examiner*—Lesley Morris
*Assistant Examiner*—Syed A Islam
(74) *Attorney, Agent, or Firm*—D. W. Eggins

(57) ABSTRACT

An illuminated, shallow weatherproof signage character has individual three dimensional back-lighted/front/side and/or silhouette-lighting, with frosted areas of plastic, with virtually no limitation on the size or number of individual characters, which may be moulded or machined from solid plastic, which is U/V protected. Miniature, preferably LED lamps are concealed in the character. The life of the LED lamps is extended by limiting the applied voltage and the "on" time. The signage characters are usually elevated from their supporting surface, to effect back-lighting. Colored LED's or a RBG LED, can be used selectively to color the plastic signage.

2 Claims, 3 Drawing Sheets

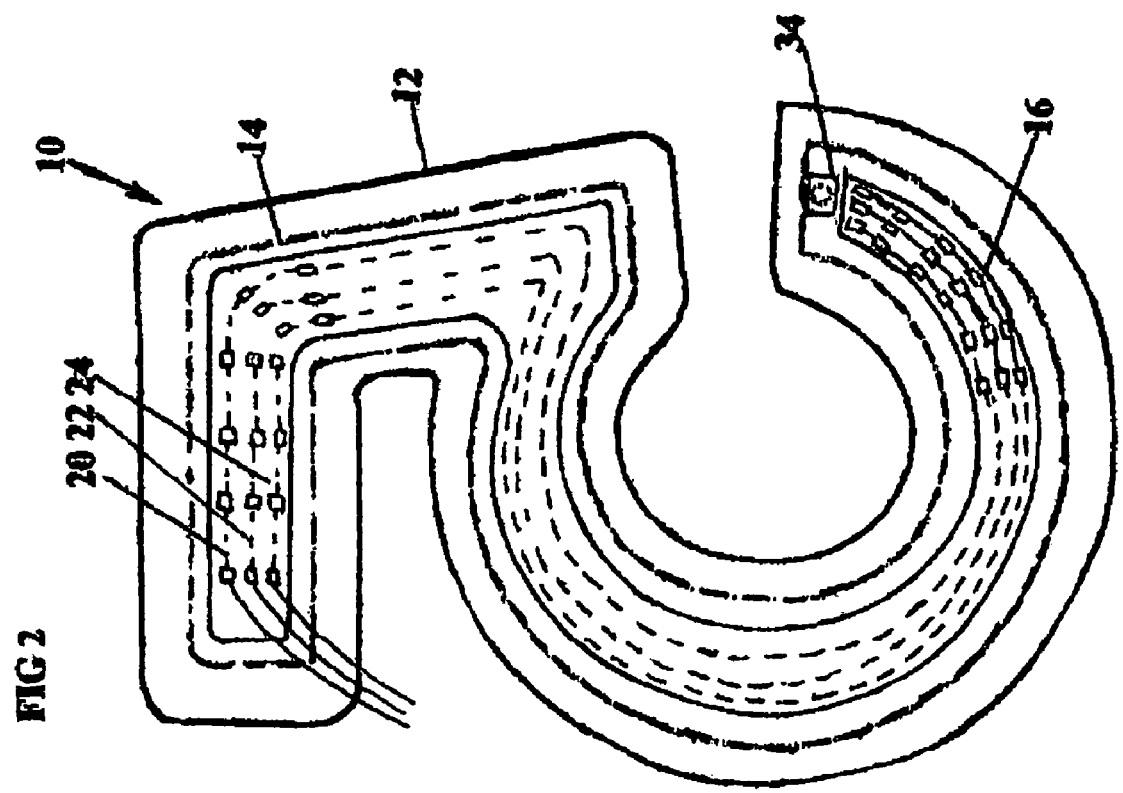
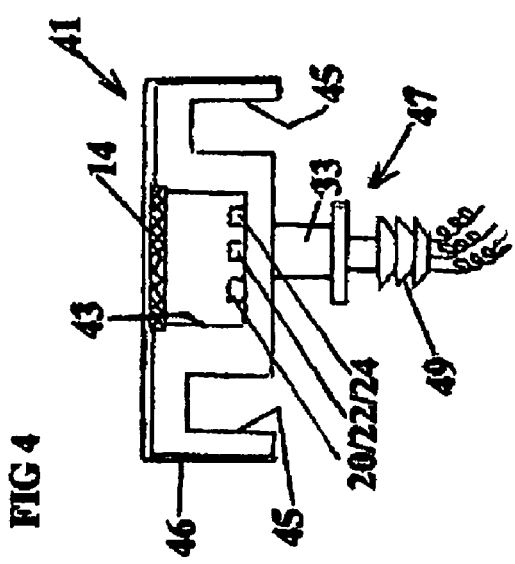
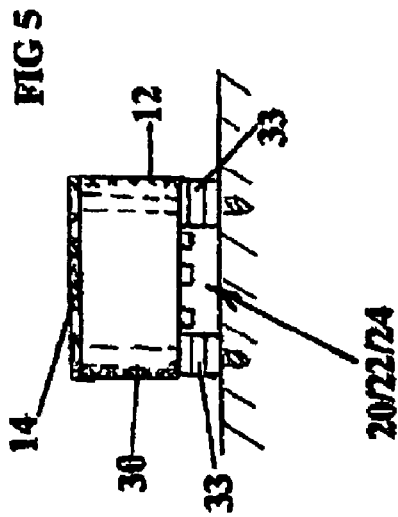

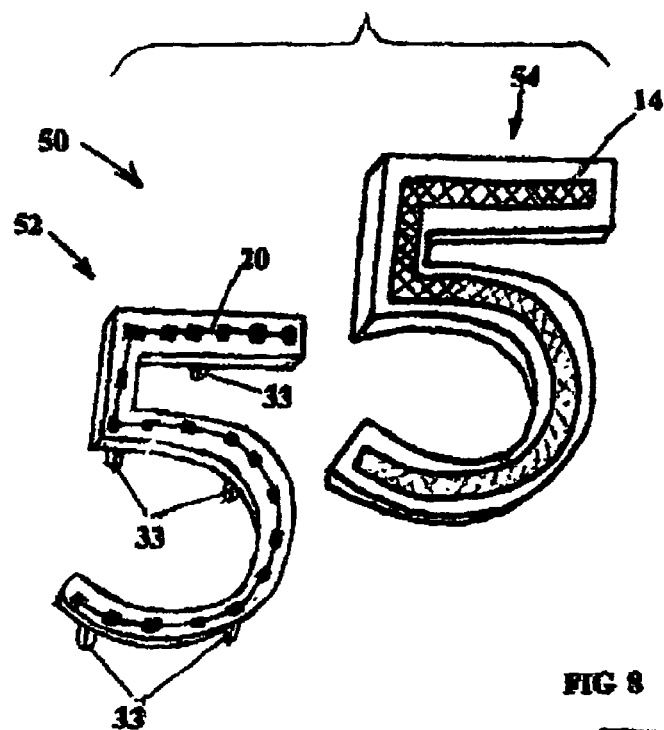
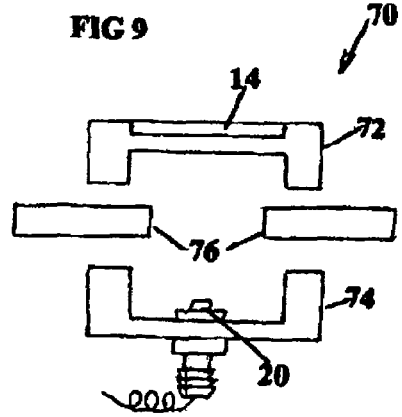
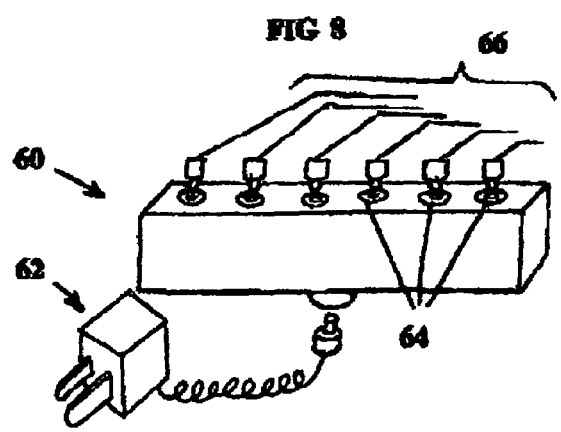

LED ILLUMINATED HOUSE NUMBER AND SIGN CHARACTERS

CROSS-REFERENCE TO RELATED APPLICATIONS

This is a Continuation in Part of application Ser. No. 10/729,927 filed Dec. 9, 2003 now U.S. Pat. No. 7,263,792, which is incorporated herein by reference.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

1. This invention is directed to house numbers and signage characters that are back-lighted and silhouette-lighted using refractional and diffusional projection illumination in conjunction with miniature lamps in association with a shallow character body, for advertising signage, and for identification purposes, such as house numbers. The preferred tamps are light emitting diodes (LED's)

2. There are products presently available in the market that use neon tube lights to back-light signs such as house address numbers, and other uses. Such prior arrangements operate at high voltages, and are incorporated with an electrical box of some four inches depth to accommodate the neon lamp and its associated wiring. Cooling of the neon lamp presents problems.

There is currently a need to illuminate house numbers, so that they can be readily seen from a distance, as when viewed from the street.

Under present circumstances, when an emergency call is made to a service such as the Fire Service, involving a domestic fire or a heart attack, it is frequently necessary for a pilot spotter vehicle to precede the response team, in order to locate the given address of the premises where the crisis exists. In such instances, the currently available illuminated signage is frequently indecipherable from the street, due to its limited size. This renders it virtually useless at a time when it is most urgently needed. The delay associated with such circumstances can prove to be fatally critical.

BRIEF SUMMARY OF THE INVENTION

The present invention provides illuminated signage consisting of a weatherproof, shallow wall-mountable display having individual front/back-lighted and/or silhouette-lighted/three dimensional indicia. There is virtually no size limitation on the viewing area of individual indicia, or on the number of indicia used, and longevity and protection against ambient conditions are achieved.

The longevity of the preferred illuminating lamps, light emitting diode (LED) lamp units, is significantly promoted in the present invention by operating the LED lamps at a predetermined voltage less then the rated voltage; and also by regulating their operation in response to ambient light conditions. Thus, when there is sufficient ambient light to clearly illuminate the signage externally, the power supply to the signage is then automatically switched off, thereby extending the service life of the LED lamps, and of the sign.

Protection from long-term ultra violet damage is provided by the inclusion of a U/V protective additive to the plastic from which the sign is moulded or machined.

In one embodiment an array of LED lights is flush-mounted to the back of an indicia, such as each of the indicia of a house number, and the indicia is provided with spacer means to elevate it from the surface to which it is attached, for purposes of back-lighting.

When the LED lamps are energized, their light serves to illuminate the supporting surface upon which the indicia is mounted, so as to back-light/side light/front light the indicia, and thus to profile-illuminate it.

The LED illuminating sources may be recessed in a plastic body having frosted surfaces and/or translucent surfaces, whereby the LED-sourced light is diffused, and the plastic body upon which the opaque character may be mounted, is illuminated three-dimensionally.

Using individual 'strings' of different "coloured" LED's, or a string of LED lamps, each of which contains a red, a blue, and a green (RGB) segment, each segment being connected in a respective (separate) R, G and B circuit, the colour of the emitted light, and that of the plastic can be controlled in accordance with the LED circuit that is energized.

In one embodiment, having a plastic body moulded or machined by way of computerized, numerically controlled (CNC) routering from a solid plastic material, in the shape of the desired indicia, an outer (viewing) face portion or portions of the body may be blanked-off (masked) or given frosted surfaces, to provide a profile silhouette of the desired indicia character, with a lighted surround, by way of the frosted plastic.

The opaque masking may be fully or partially recessed into the viewing surface of the plastic body, as desired.

The illuminating LED lamp arrays may be located within the plastic body, positioned behind and concealed by the indicia mask.

When illuminated, by energization of the LED's, the character appears in silhouette, being three-dimensionally illuminated, with a lighted background/surround, by way of the frosted body. This provides an illuminated character having a novel, ultra slim (i.e. shallow) profile, not previously known.

The manufacturing system is sufficiently flexible that the subject panels may include customized graphics.

One embodiment of the invention has an outer, viewing portion of the body formed of metal or opaque plastic, and incorporating an external peripheral rib of illuminated plastic, to profile-light the character.

Protection of the signs against U/V deterioration is achieved by the inclusion of a U/V-protective element in the plastic mix. Alternatively, a U/V protective coating may be applied to the exposed surfaces of the moulding.

A further characteristic of the subject invention is the use of a photocell, to de-energise the LED lamp circuit/circuits when a predetermined level of local illumination occurs, such as daylight, or street-lighting of sufficient intensity to make the 'character' of the signage readily visible.

This de-energizing is achieved by interrupting the low voltage A.C. or D.C. circuit of the LED lamps.

The resulting (approximately 50%) reduction in LED light energisation correspondingly extends the life expectancy of the LED lamps A further characteristic of the present invention is the operation of the LED lamps at a voltage/or amperage less than the rated voltage or amperage of the lamps such that the level of illumination is reduced to a perceptible degree without unduly compromising visibility of the sign, while correspondingly extending the life expectancy of the LED lamps.

It will be understood that there is substantially no inherent limitation on the size of individual characters that can be created using the subject system As a consequence of these innovations, the subject illuminated signage permits of distant viewing, while being U/V protected; operating only when ambient light conditions are inadequate to make the signage clearly visible; and operating at a reduced voltage, less than the permissible optimum (rated) voltage, with correspondingly extended life expectancy.

The signage may incorporate individually coloured strings of LED lamps, or strings of "divided" LED lamps, each lamp being connected/divided into Red, Green, Blue components with individual 'colour' to correspondingly colour the illuminated borders of the character.

Variable coloured light is thus provided when the selected circuit is changed, and another circuit is energized to produce a predetermined colour output from the LED's.

The subject signage may be powered by household power, through a step-down transformer (A.C.) or a transformer/rectifier (D.C.); by a solar cell, or alternative electrical sources.

Each character may be individually connected to a junction panel/splitter box, for multi character electrical connection.

In the cause of further prolonging the service life of the LED lamps, use is contemplated of an oscillator circuit, when the LED lamps are energized, such that the lamps are energized on and off at a frequency of about 32 cycles per second, thereby presenting a visual appearance of being continuously illuminated, while significantly reducing the actual accumulated duration of illumination, with correspondingly enhanced service life.

Control of the supply frequency may also be used when reducing the lamp operating voltage, so as to extend the life-cycle of the LED lamps.

Selection of a lower frequency oscillator can provide a visually discernable flashing signage, which may be attractive for commercial usage, with potentially further extended service life of the LED lamps.

In discussing the potentially shallow form of the subject lamps, it will be understood that the current standard is a minimum depth of approximately four inches, plus the depth of a neon tube, such that a subject signage having a depth as much as two inches may be regarded as being "shallow", and where significantly shallower signages are achieved, namely in the range of one-half inch to one inch, i.e. about ⅛ inch above the LED lamps.

BRIEF DESCRIPTION OF THE SEVERAL VIEWS OF THE DRAWINGS

Certain embodiments of the invention are described by way of illustration, without limitation thereto other than as set forth in the accompanying claims, reference being made to the accompanying drawings, wherein:

FIG. 2 is a rear elevation (at a reduced scale) of the FIG. 1 embodiment;

FIG. 4 is a view similar to FIG. 3 of a further embodiment of the present invention;

FIG. 5 is a view similar to FIG. 4 of a further embodiment of the present invention;

FIG. 7 is an exploded perspective frontal view of a further embodiment of a subject signage body;

FIG. 8 is a diagrammatic perspective view of a junction box and circuitry for a multi-symbol display; and, FIG. 9 is a cross-sectional view, in partially exploded relation, of the component parts of a further signage embodiment in accordance with the present invention.

DETAILED DESCRIPTION OF THE INVENTION

Figure 1:
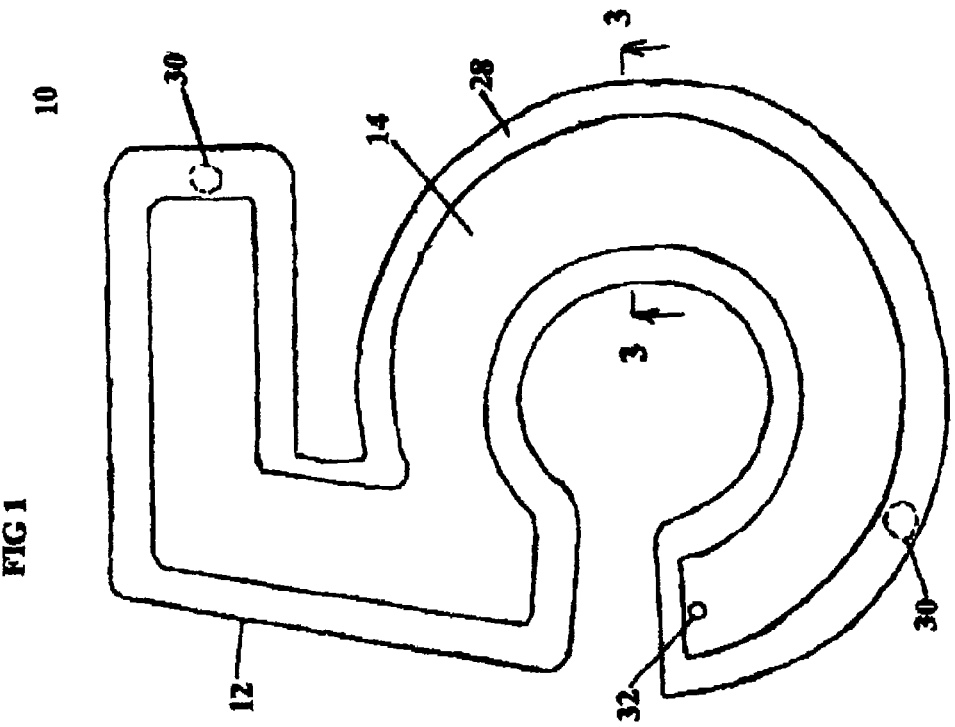
FIG. 1 is a front elevation of an embodiment of an illuminated digit in accordance with the present invention.

Referring to FIG. 1, an illuminated signage 10, is illustrated in the form of the numeral five.

The sign has a translucent plastic body 12 in the desired shape, such as a numeral or other object such as a figure, with a shape opaque mask 14 profiled by the body 12, which forms a surrounding border about the mask.

Figure 3:
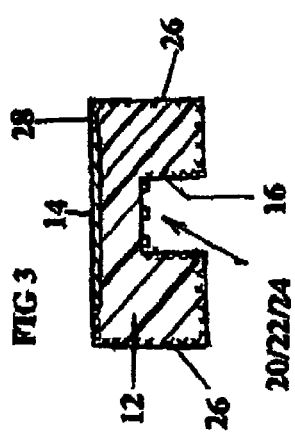
FIG. 3 is a cross section view taken at 3-3 of FIG. 1.

Referring to FIG. 3, it will be seen that the FIG. 1 embodiment has the opaque mask portion 14 recessed flush with the front, viewing face, of the body 12.

Referring to FIGS. 2 and 3, the body 12 is recessed behind the mask or the frosted facial 14, forming a concealed channel 16 in which a series of LED lamps 20, 22, 24 are arranged. The illustrated three series of lamps 20, 22, 24 are of different colours, such that energization of a particular series (or string) produces light of a predetermined colour The walls of channel 16 and the exterior surfaces 26, 28 of the body 12 are frosted, in order to diffuse the LED light through the plastic body, effectively illuminating it in the predetermined colour of the selected LED lamp circuit.

As shown in FIGS. 1 and 5; the signage body 12 has two or more screw recesses 30 through which support screws are inserted, for mounting the signage 10 on a (generally vertical) support surface.

In the case of an embodiment wherein the illumination of the LED light is concentrated upon the support surface from which the signage 10 is suspended, distance pieces 33 interposed between the body 12 and the support surface use the illumination of the support surface as back-lighting for the signage 10.

An aperture 32 in the body 12 serves to admit incident light to a photo cell relay 34 that is mounted within the channel 16. This photocell relay 34, when energized by ambient outside light, serves as a cut-out relay, isolating the LED lamps from their electrical source, thereby extinguishing them.

The signage 10 is connected to a power source (not shown) by way of concealed wires leading from the rear of the body 12 and threaded through the support surface and for a multi-character signage a multi junction/splitter box is used (see FIG. 8).

Referring to the FIG. 4 embodiment, a signage character with cross-section 41 has a frontal recess 43, illustrated as containing three strings of LED lamps 20/22/24, and having an opaque mask 14 in concealing relation with the LED lamps. The signage 41 has twin recesses, primarily to reduce the mass of plastic required. Mounting plugs 47, for insertion through pre-drilled wall board or panels, incorporate spacers 33 having a stop disc. The hollow mounting plugs 47 can accommodate the associated wiring circuits.

Figure 6:
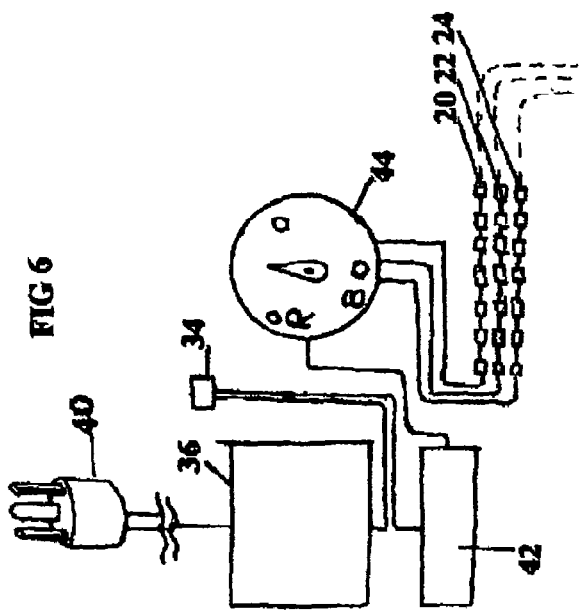
FIG. 6 is a diagram of a circuit for controlling the illumination of the subject signage.

Referring to FIG. 6, a power source such as a domestic house circuit, accessed by plug 40, may supply a transformer/rectifier 38, or by connection to a bell-circuit, or a solar cell, neither of which are shown. The photo cell relay 34 is connected to control the series connection between the external power supply as represented by the power connection 40 and the AC/DC transformer/rectifier power supply 36, which powers the LED lamp circuits 20, 22, 24, so as to open-circuit the power supply 36 during daylight hours, and to close it, and energize the LED's 20, 22, 24 when ambient light dims to a pre-set threshold level. Thus, when daylight diminishes and the photo cell 34 operates, this permits the LED lamps 20, 22, 24 to become energized, and the signage character 10 is illuminated.

The power supply 36 is illustrated as driving an oscillator 42, which serves to reduce the actual accumulated duration of illumination, while enabling the operation of the LED lamps at lower-than-rated voltage; and also retaining the visual appearance of continuous lighting by the LED's.

Selection of a lower oscillator frequency can provide a visibly flashing signage, which may be attractive for commercial usage, while potentially further extending the service life of the LED's.

In the illustrated multi-colour embodiment, a circuit selector mechanism 44 is shown. This selector mechanism 44, illustrated schematically as being manually controlled, may be electronically controlled, to energise a selected one of the illustrated three coloured-LED's circuits.

In some circumstances, where only an illuminated sign is required, the blanking mask 14 may be omitted, as shown in FIG. 4, with the whole of the body 12 being illuminated.

The LED lamps and their associated wiring at the back of the signage is preferable protected and weather-proofed with a epoxy resin or silicone (spray-on) coating. In the FIG. 7 embodiment a signage 50, illustrated as being a numeral five, has an underbody portion 52 and an overbody portion 54, which clips over and enshrouds the underbody portion 52. A face portion 14 of the overbody portion 54 is opaque, and overlies and conceals the string of LED lamps 20 that are mounted on the interior face of underbody portion 52. The underbody portion 52 is shown as being provided with spacer portions 33, which raise the signage 50 proud of the backing surface on which it is mounted, so as to provide backlighting to the signage 50.

FIG. 8 shows a multi-port junction box 60, illustrated as being supplied from a transformer/rectifier 62. The junction box 60 is shown as having six outlets 64, to which a corresponding six individual digit circuits or letters may be connected and energized.

Referring to FIG. 9, the sectioned signage embodiment 70 is in the shape of a letter, digit, or other character, having an upper body portion 72 with at least the central, face portion 14 of opaque material, and a lower body portion 74.

The body portions 72, 74 may be of metal or of plastic.

An intermediate, fin or fins portion 76 of translucent plastic is sandwiched between the upper and lower body portions 72, 74 and protrudes from both sides of the signage 70, as a light guide means. The lower body portion 74 contains a string or strings of LED lamps, illustrated as a single lamp 20 for purposes of simplification.

In use, the light from the LED lamps 20 enters and illuminates the fin or fins 76, serving to both silhouette and back-light the digit or other form of the signage character.

The invention claimed is:

1. A stand-alone three-dimensional illuminated signage character having a unitary, shaped plastic body portion with a lower metal portion secured thereto, a channel in said character in the shape of said signage containing LED miniature lamps located in mutually spaced relation within said channel; a visual mask of metal located in concealing relation before said lamps; a spacer mounting extending in concealed relation behind said body, in use to attach said character in predetermined spaced relation before a supporting surface; and a plastic, light transmitting portion positioned in sandwiched relation between said lower metal portion and said plastic portion and extending laterally outside said lower metal and said plastic body portions, to receive LED light diffused through said plastic body portion and illuminate said supporting surface, to back-light said character.

2. A stand-alone illuminated signage character having a unitary, shaped plastic body having an upper body portion, a lower body portion and an intermediate fin of translucent plastic protruding laterally beyond said upper and lower body portions; a channel in said body portion in the shape of said signage character having a plurality of miniature lamps located in mutually spaced relation within said channel; a spacer mounting extending in concealed relation behind said body, in use to attach said character in predetermined spaced relation before a supporting surface, and a visual mask located in concealing relation before said miniature lamps, whereby in use light from said lamps is diffused by said plastic body and illuminates said intermediate fin, saod body and said supporting surface, to silhouette and back-light said character.

* * * * *